May 5, 1936.   E. R. SMITH ET AL   2,040,028
WORK HANDLING MECHANISM FOR MACHINE TOOLS
Filed April 8, 1932   3 Sheets-Sheet 2
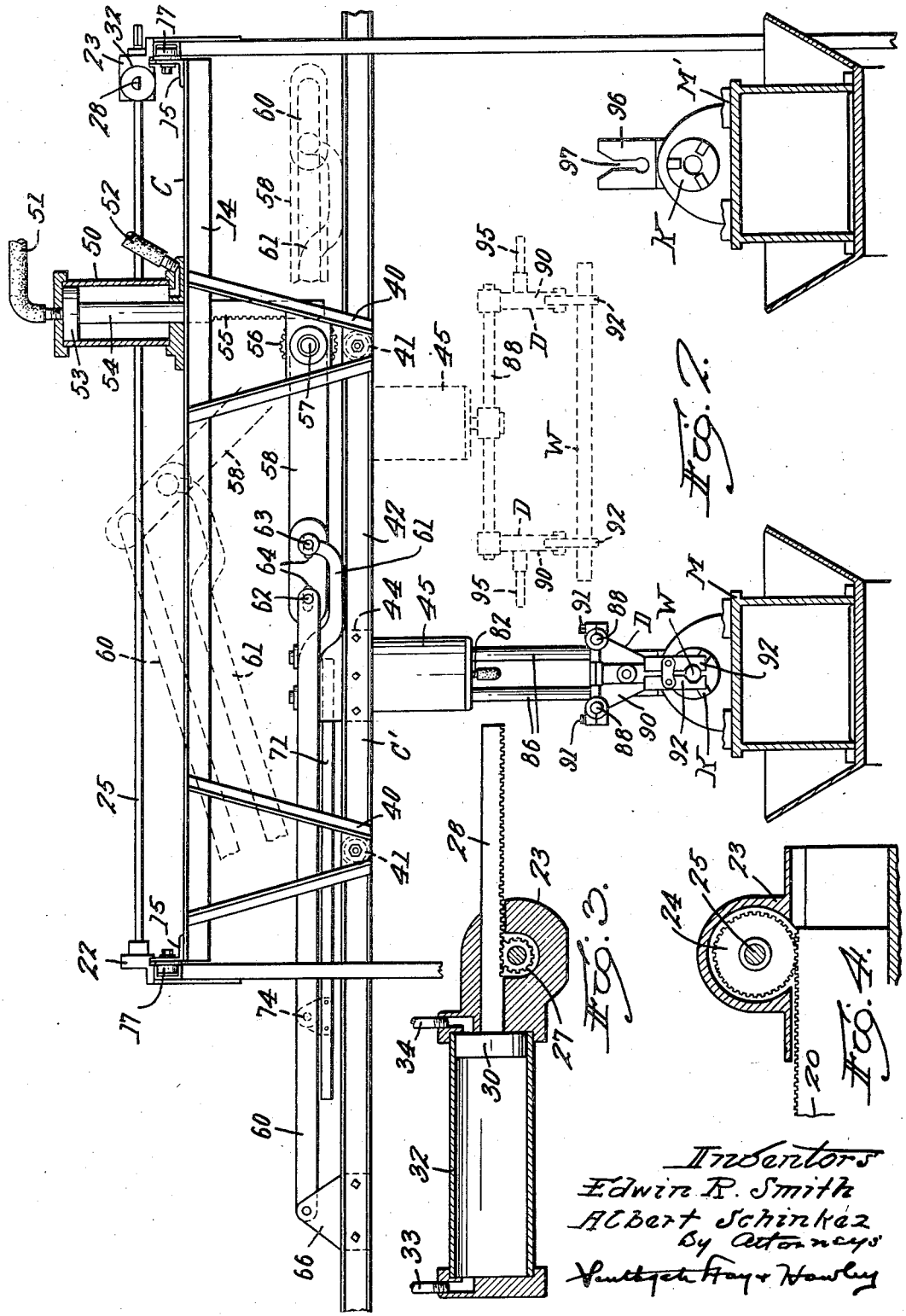

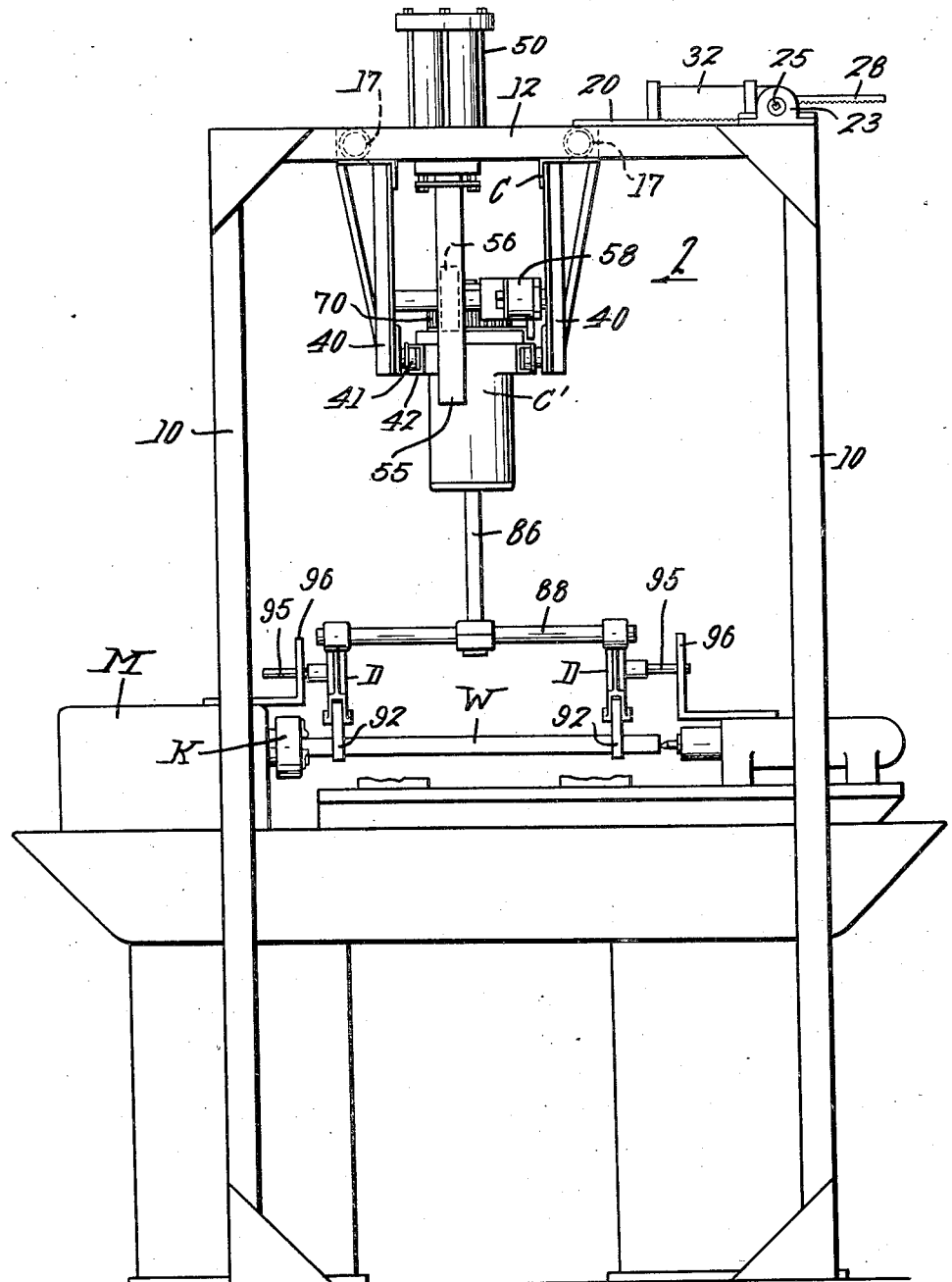

May 5, 1936. E. R. SMITH ET AL 2,040,028
WORK HANDLING MECHANISM FOR MACHINE TOOLS
Filed April 8, 1932 3 Sheets-Sheet 3
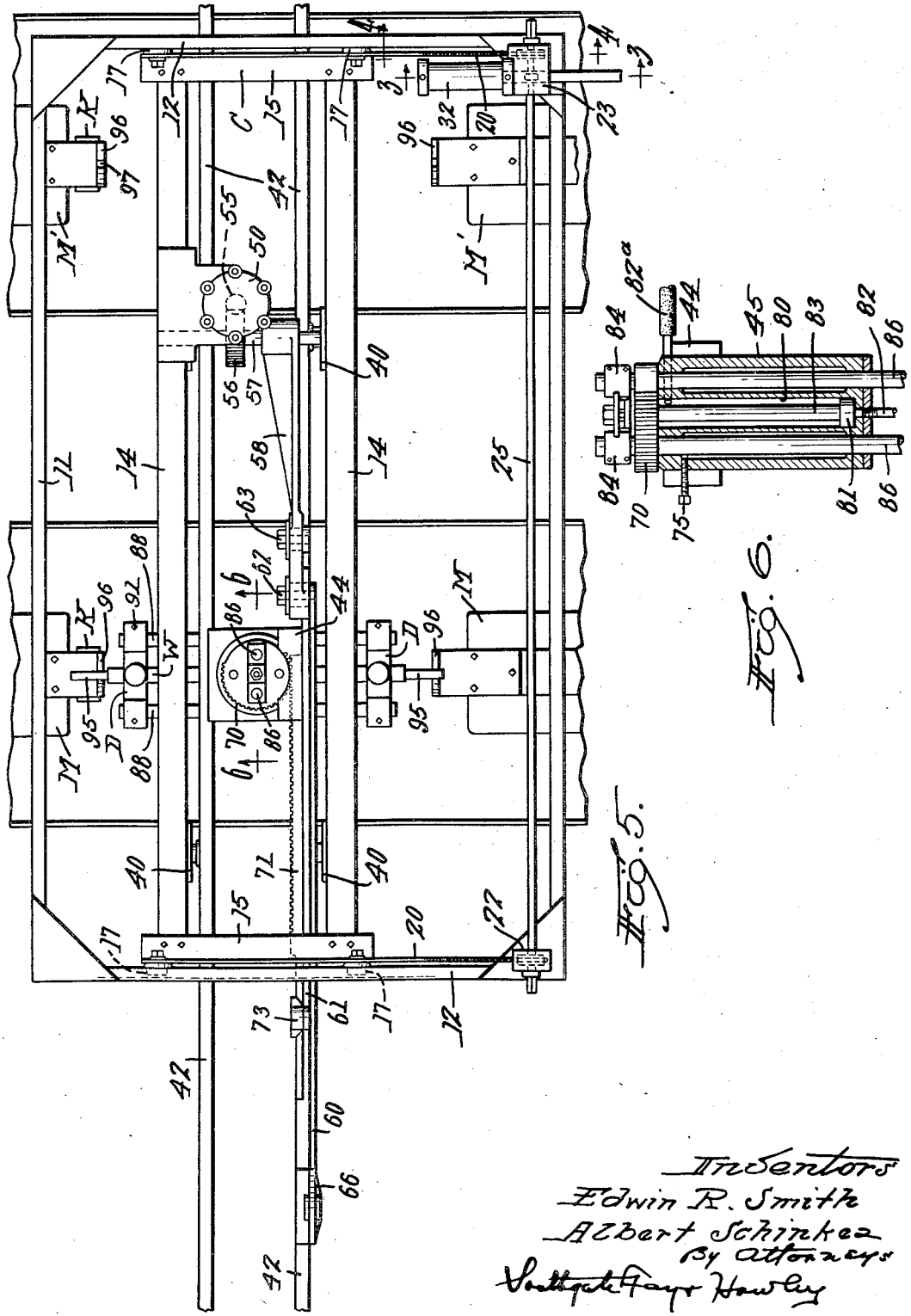

Patented May 5, 1936

UNITED STATES PATENT OFFICE 2,040,028

WORK HANDLING MECHANISM FOR MACHINE TOOLS

Edwin R. Smith and Albert Schinkez, Seneca Falls, N. Y., assignors to Seneca Falls Machine Company, Seneca Falls, N. Y., a corporation of Massachusetts Application April 8, 1932, Serial No. 604,045

14 Claims. (Cl. 82—2)

This invention relates to mechanism for handling duplicate work, particularly in connection with the operations of one or more machine tools, such as lathes, milling machines, centering machines and grinders.

Many such machines perform the same operations on duplicate work pieces without the need of an operator, except for occasional inspection, and the utility of such machines is much increased when an automatic work-handling mechanism is provided. Furthermore, it is frequently desirable to shift the work endwise after it is aligned in working position, as for insertion into a chuck. Also in many cases it is desirable to turn the work end for end during transfer to an adjacent machine or between successive operations in the same machine.

It is the general object of our invention to provide work-handling mechanism effective to perform any of the above described operations and to perform them in any desired combinations.

While we have shown a machine capable of performing all of the described operations, it should be understood that important features of our invention also reside in the mechanism and devices by which certain separate operations are accomplished.

Our invention further relates to arrangements and combinations of parts which will be hereinafter described and more particularly pointed out in the appended claims.

A preferred form of the invention is shown in the drawings, in which

Fig. 1 is a side elevation of a machine having our improved work-handling mechanism associated therewith;

Fig. 2 is an enlarged side elevation of the work-handling mechanism, with certain parts shown in section and looking in the direction of the arrow 2 in Fig. 1;

Fig. 3 is a sectional elevation of certain fluid-operated actuating mechanism, taken along the line 3—3 in Fig. 5;

Fig. 4 is a detail sectional view, taken along the line 4—4 in Fig. 5;

Fig. 5 is a plan view of our improved work-handling mechanism, and

Fig. 6 is a sectional elevation, taken along the line 6—6 in Fig. 5.

Referring to the drawings, our improved work-handling mechanism may be mounted directly upon the frame of a machine tool M or M' but is shown in the drawings as mounted on an independent support comprising uprights 10 (Fig. 1) supporting a rectangular frame-work comprising side members 11 and end members 12 (Fig. 5), each preferably formed from channel iron.

A main carriage C (Fig. 5) is mounted within the rectangular frame-work and comprises side bars 14 and end members 15 firmly secured together. The end members 15 are provided with flanged rolls 17 projecting into the channels of the fixed end frame members 12 and guided thereby.

For the purpose of moving the carriage C in the fixed supporting frame, we provide the carriage with rack bars 20 (Fig. 5) at each end thereof and extending laterally therefrom. These rack bars are slidable in guideways in bearing blocks 22 and 23 (Figs. 4 and 5) and are engaged by gears 24 mounted on a cross shaft 25 rotatable in bearings in the blocks 22 and 23.

The shaft 25 is also provided with a pinion 27 (Fig. 3) meshing with the teeth of a rack bar 28 slidable in a guideway in the bearing block 23 and having a piston 30 secured to one end thereof, an extension of the rack bar 28 acting as a piston rod for the piston 30.

The piston 30 is slidable in a cylinder 32 mounted on the fixed frame work and having pipes 33 and 34 connected to the opposite ends thereof, these pipes being reversibly connected to a supply of fluid under pressure and to the exhaust.

By admitting air, water or other fluid to one end or the other of the cylinder 32, the carriage C may be moved along the fixed end frame members 12 whenever it is desired to shift the work W axially of the machine tool M with which the work-handling mechanism is associated. The carriage C is provided with spaced pairs of depending brackets 40 (Fig. 2), each of which supports a flanged guide-roll 41.

A second carriage C' is mounted below the main carriage C and is provided with side rails 42, preferably in the shape of channel irons and supported by the guide-rolls 41. The rails 42 may be of any desired length and commonly extend beyond the fixed supporting frame, as clearly shown in Fig. 5.

A bearing block 44 (Fig. 6) is secured to the side rails 42 and rotatably supports a cylinder casing 45. The mechanism for moving the carriage C', block 44 and casing 45 endwise on the carriage C includes a cylinder 50 (Fig. 2) mounted on one of the side bars 14 of the carriage C and having pipes 51 and 52 reversibly connecting the opposite ends of the cylinder to a source of supply of fluid under pressure and to the exhaust.

A piston 53 is slidable in the cylinder 50 and is provided with a piston rod 54 having a toothed or rack portion 55. The rack 55 engages a gear 56 on a cross shaft 57 rotatable in bearings in an associated pair of the depending brackets 40 previously described. An arm 58 is fixed to the shaft 57.

Links 60 and 61 (Fig. 2) are pivoted on studs 62 and 63, adjustably secured in spaced slots 64 in the arm 58. The outer end of the link 60 is connected to a bracket 66 mounted on one of the side rails 42. Consequently the swinging of the arm 58 about the axis of the shaft 57 from the full line position to the dotted line position in Fig. 2 will have the effect of shifting the side rails 42 and carriage C' a predetermined distance lengthwise of the carriage C.

This distance represents the distance between the center lines of two associated machine tools, such as M and M' in Fig. 2, and is equal to twice the distance from the center of the fixed shaft 57 to the center of the stud 62 in the arm 58. By varying the length of the arm 58, the extent of shifting movement may be widely varied and slight changes in the extent of movement may be made by adjusting the stud 62 in its slot 64.

It is sometimes desirable to reverse the work W end for end as it is shifted from one machine M to an adjacent machine M'. For this purpose we provide the cylinder casing 45 with a segmental gear 70 (Figs. 5 and 6) engaged by a rack bar 71 slidable endwise relative to the side rails 42 of the lower or second carriage C'. The rack bar 71 is provided at its outer end with a bracket 73 having a stud 74 to which the outer end of the link 61 is pivoted.

The rack bar 71 is slidable in suitable bearings or guideways and will be moved endwise as the arm 58 moves from the full line position to the dotted line position in Fig. 2, the extent of this movement being determined by the radial distance of the stud 63 from the shaft 57. This distance is usually so selected that the cylinder casing 45 will make one-half of a revolution as the carriage is shifted from the machine M to the machine M'.

In special cases, however, the mechanism may be set to rotate the cylinder 45 either more or less than a half revolution by varying the effective length of the arm 58. When no rotation of the cylinder casing 45 is desired, the link 61 may be removed and the cylinder may be clamped in fixed position in any convenient manner, as by a set screw 75 (Fig. 6).

We have thus provided fluid-actuated mechanism for shifting the carriage C' and cylinder casing 45 from one machine to another and also for partially rotating the cylinder casing 45 during such shifting movement, provided such rotation is desired.

The cylinder casing 45 is provided with an inner cylindrical chamber 80 (Fig. 6) in which a piston 81 is slidable. Pipes 82 and 82ª connect the opposite ends of the cylindrical chamber 80 through a suitable reversing control valve (not shown) to a source of supply of fluid under pressure.

A piston rod 83 extends upward from the piston 81 through the segment gear 70 and is suitably connected at its upper end to collars 84 on the upper ends of a pair of plungers 86. The plungers 86 are slidable in upper and lower bearings in the cylinder casing 45, and at their lower ends support a pair of spaced cross rods 88 on which suitable work-gripping or engaging devices D are mounted.

As pressure is admitted through the lower pipe 82, the piston 81 will be raised, carrying with it the piston rod 83 and the plungers 86 and thus lifting the work-engaging devices D. When pressure is admitted through the upper pipe 82ª, the piston 81, plungers 86 and work-engaging devices D will be moved downward to alignment with the work spindle. The work-engaging devices D are each adjustable lengthwise of the cross rods 88, so that their spaced relation may be varied as desired.

Each work-gripping or engaging device D comprises a frame member 90 slidably mounted on the cross rods 88 and adapted to be clamped in position thereon by tightening screws 91 (Fig. 2). Work-engaging grippers 92 are indicated in the drawings for grasping the work W and holding it during movement from one machine to the other.

Any suitable mechanism may be provided for actuating the work-engaging members and such mechanism in itself forms no part of our present invention. For a disclosure of actuating mechanism suitable for this purpose, reference is made to our prior Patent No. 1,841,988 issued January 19, 1932.

Guide-pins 95 are preferably secured in the frame members 90 and cooperate with guide-plates 96 fixed to the head and tail stocks of the machines M and M' and provided with slots or openings 97 to receive the pins 95 and thus accurately center the work with respect to the work centers of the machines.

Having described the details of construction of our improved work-handling mechanism, the general operation and advantages will be readily apparent. The work may be raised or lowered by connecting the lower end of the cylinder space 80 in the cylinder casing 45 to a supply of fluid pressure. After the work is raised, it may be shifted transversely from one machine M to an adjacent machine M' by the admission of pressure to the cylinder 50. During such movement, the cylinder 35 may be turned through a selected angle if desired.

After the work is newly aligned with the work centers, it may be shifted endwise by the application of pressure in the fixed cylinder 32, such endwise movement being convenient for inserting a piece of work W in a chuck K as indicated in Fig. 1.

All desired movements of the work are thus easily and quickly accomplished. Suitable control mechanism may be provided by which these movements take place automatically and in timed relation to the operations of the machine tool with which the work-handling mechanism is associated. For an example of such automatic control mechanism, reference is again made to our prior Patent No. 1,841,988.

A particular advantage of our work-handling mechanism is the provision of means for turning the work during its transfer from one machine to another. Obviously by disconnecting the links 60, the work may be raised, partially rotated, and then lowered and re-inserted in the same machine, all without transverse movement of the carriage C'.

While we have shown hydraulic actuating mechanism, many of the advantages of our improvements are retained when electric "torque" motors are substituted and such use is considered to be within the scope of our invention.

Having thus described our invention and the advantages thereof, we do not wish to be limited to the details herein disclosed, otherwise than as set forth in the claims, but what we claim is:—

1. Work-handling mechanism for machine tools comprising work-engaging devices, means to raise and lower said devices, means to shift the work transversely of the machine tool, means to turn the work angularly during such transverse movement and in a plane parallel to the plane of such transverse movement, and a single actuating device for said shifting and turning means.

2. Work-handling mechanism for machine tools comprising work-engaging devices, means to raise and lower said devices to move the work from a working plane to a transfer plane, a carriage on which said raising and lowering means is mounted, means to shift said carriage transversely of said machine tool, thereby moving the work in the transfer plane, and means to turn said raising and lowering means angularly on said carriage as said carriage is shifted transversely, thereby reversing the work in the transfer plane.

3. Work-handling mechanism for machine tools comprising work-engaging devices, means to raise and lower said devices, a carriage on which said raising and lowering means is mounted, means to shift said carriage transversely of said machine tool, means to turn said raising and lowering means angularly on said carriage as said carriage is shifted transversely, and a single fluid-operated actuating mechanism for simultaneously operating said transversely shifting and said angularly turning means.

4. Work-handling mechanism for machine tools comprising a fixed frame, a carriage movably mounted thereon, means to move said carriage, a second carriage mounted on said first carriage and movable in a direction perpendicular to the movement of said first carriage, work-engaging devices supported by said second carriage, said work-engaging devices being rotatable as a unit about a vertical axis on said second carriage, means to move said second carriage, and means to turn said work-engaging devices about said vertical axis.

5. Work-handling mechanism for machine tools comprising a fixed frame, a carriage movably mounted thereon, means to move said carriage, a second carriage mounted on said first carriage and movable in a direction perpendicular to the movement of said first carriage, work-engaging devices supported by said second carriage, said work-engaging devices being rotatable as a unit about a vertical axis on said second carriage, and a single actuating mechanism effective to move said second carriage and also to turn said work-engaging devices about said vertical axis.

6. Work-handling mechanism for machine tools comprising a fixed frame, a carriage movably mounted thereon, means to move said carriage, a second carriage mounted on said first carriage and movable in a direction perpendicular to the movement of said first carriage, work-engaging devices supported by said second carriage, said work-engaging devices being rotatable as a unit about a vertical axis on said second carriage, a crank arm mounted on said first carriage, means to move said crank arm about an axis on said carriage, and separate connections from said crank arm to said second carriage and to said turning means.

7. Work-handling mechanism for machine tools comprising a fixed frame, a carriage movably mounted thereon, means to move said carriage, a second carriage mounted on said first carriage and movable in a direction perpendicular to the movement of said first carriage, work-engaging devices supported by said second carriage, said work-engaging devices being rotatable as a unit about a vertical axis on said second carriage, a crank arm mounted on said first carriage, separate connections from said crank arm to said second carriage and also to said turning means, and means to adjust the effective movements of said connections.

8. Work-handling mechanism for machine tools comprising a fixed frame, a carriage movably mounted thereon, fluid-pressure operated means to move said carriage, a second carriage mounted on said first carriage and movable in a direction perpendicular to the movement of said first carriage, fluid-pressure operated means mounted on said first carriage and effective to move said second carriage, work-engaging devices on said second carriage, and fluid-pressure operated means to raise and lower said work-engaging devices.

9. Work-handling mechanism for machine tools comprising a fixed frame, a carriage movably mounted thereon, fluid-pressure operated means to move said carriage, a second carriage mounted on said first carriage and movable in a direction perpendicular to the movement of said first carriage, fluid-pressure operated means mounted on said first carriage and effective to move said second carriage, work-engaging devices on said second carriage, and fluid-pressure operated means to raise and lower said work-engaging devices said latter means being mounted on said second carriage.

10. Work-handling mechanism for machine tools comprising work-engaging devices, a support therefor, means to raise and lower said support and to shift said support transversely relatively to the work axis, and cooperating guiding means on said support and on the machine tool, effective to definitely locate said support transversely as the work-engaging devices move downward to place the work in working position.

11. The combination in work-handling mechanism as set forth in claim 10, in which the cooperating guiding means comprises guide studs on the support for the work-engaging devices and guiding members mounted on the machine tool and having guide slots open upwardly to receive said studs, said slots having upwardly enlarged entrance portions to correct the transverse position of a slightly misaligned support.

12. Work-handling mechanism for machine tools comprising a fixed frame, a carriage movably mounted thereon, fluid-pressure operated means to move said carriage to shift the work longitudinally of the machine tool, a second carriage mounted on said first carriage and movable in a direction perpendicular to the movement of said first carriage, fluid-pressure operated means mounted on said first carriage and effective to move said second carriage to shift the work transversely of the machine tool, work-engaging devices on said second carriage, and fluid-pressure operated means to raise and lower said work-engaging devices.

13. The combination in work-handling mechanism as set forth in claim 12, in which means is provided for turning the work through a predetermined angle during the transverse shifting of said second carriage.

14. The combination in work-handling mechanism as set forth in claim 12, in which means is provided for turning the work through a predetermined angle during the transverse shifting of said second carriage and in which adjustable connections are provided for varying the predetermined angle.

EDWIN R. SMITH.
ALBERT SCHINKEZ.